June 28, 1949.　　　　N. FLESCH　　　　2,474,239
BRAKE HEAD BALANCING DEVICE
Filed Sept. 16, 1944
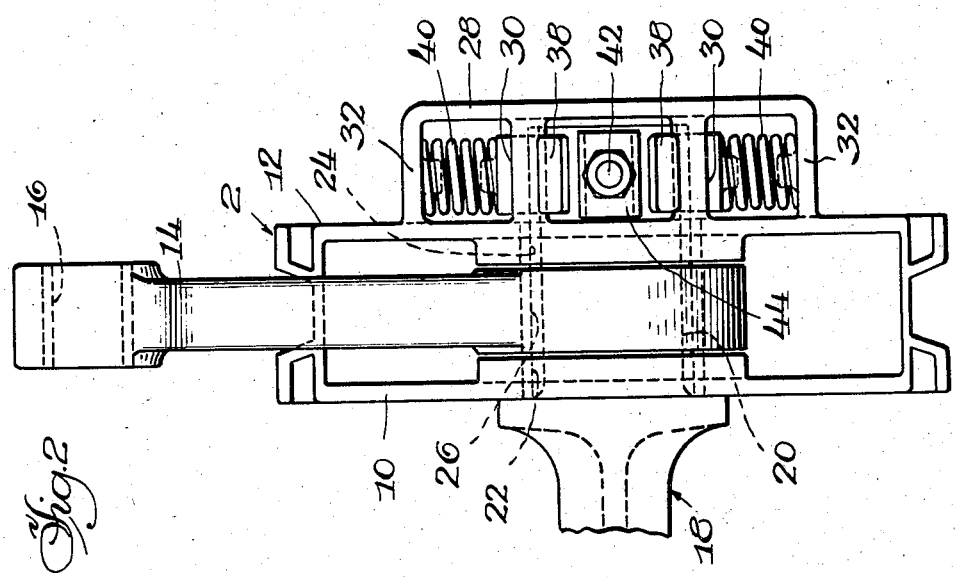
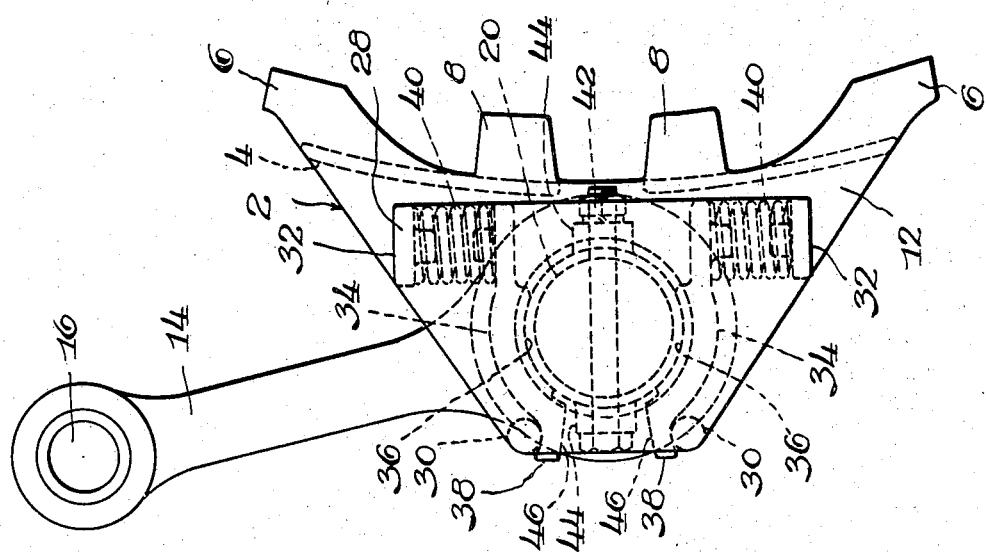
INVENTOR.
Norman Flesch
BY Patented June 28, 1949

2,474,239

UNITED STATES PATENT OFFICE 2,474,239

BRAKEHEAD BALANCING DEVICE

Norman Flesch, Chicago, Ill., assignor to American Steel Foundries, Chicago, Ill., a corporation of New Jersey Application September 16, 1944, Serial No. 554,383

18 Claims. (Cl. 188—207)

My invention relates to railway brake equipment and more particularly to a device for yieldingly maintaining a brake head in a desired position relative to its supporting member, such an arrangement being commonly known in the art as a brake head balancing device.

The general object of my invention is to design a device such as above described in which a shoe or lever carried by the brake head is urged by a spring against the cylindrical perimeter of a brake beam trunnion which connects the head to an associated hanger.

In my novel arrangement the spring is compressed between one end of the lever and an integral wall or lug on the brake head, thereby eliminating the use of a threaded member, such as a nut, commonly utilized to achieve the desired spring pressure.

A more specific object of my invention is to devise a brake head balancing device in which a pair of opposed levers are fulcrumed at corresponding ends thereof from the brake head and are actuated at the opposite corresponding ends thereof by springs compressed against integral walls of the brake head, said levers being frictionally engaged intermediate the ends thereof with the brake beam trunnion which is provided with novel means for preventing the head from "walking off" the end of the trunnion and for preventing excessive rotation of the head relative to the trunnion by abutment with the fulcrumed ends of the levers.

In the drawings, Figure 1 is a side elevation of my novel device, and Figure 2 is a rear elevation taken from the left as seen in Figure 1.

Describing the device in detail, the brake head, generally designated 2, comprises a front wall 4 formed with spaced end lugs 6, 6 and spaced intermediate lugs 8, 8, all of said lugs being formed and arranged for connection in conventional manner to an associated brake shoe (not shown). The front wall 4 is formed with the inboard and outboard side walls 10 and 12, receiving therebetween a hanger 14 having at its upper end a bushed opening 16 for pivotal connection to the frame of an associated vehicle, such as, for example, a railway car truck.

A brake beam, generally designated 18, is provided for pivotally interconnecting the hanger and the head, said beam being adapted in conventional manner for connection to associated actuating means (not shown), such as a brake lever, by which the beam and head are urged into braking cooperation with an associated rotatable member, such as the wheel of a railway car truck. The beam 18 comprises a bushed trunnion end 20 extending through bushed openings 22 and 24 in the inboard and outboard walls 10 and 12 of the head 2 and through an aligned bushed opening 26 in the hanger, thereby affording the before-mentioned pivotal connection between the brake head and hanger.

The brake head 2 also comprises a web 28 outboard the wall 12 and connected thereto by means of trunnion lugs 30, 30 and spring seat lugs or walls 32, 32. The friction means for yieldingly resisting relative rotation of the brake head with respect to the trunnion 20 of the brake beam 18 comprises top and bottom levers or shoes 34, 34, each of which is in frictional engagement as at 36 (Figure 1) intermediate the ends thereof with the cylindrical perimeter of the bushed trunnion 20. The corresponding ends of the levers are provided with arcuate hooklike portions 38, 38 fulcrumed against the trunnion lugs 30, 30, and the opposite corresponding ends of the levers are actuated by springs 40, 40 compressed between the levers and the spring seat walls 32, 32.

A bolt and nut assembly, generally designated 42, is provided for maintaining the head and hanger on the trunnion 20 by resisting any tendency of the head to "walk off" the end of the trunnion, said assembly including enlarged washers 44, 44 in complementary cylindrical face engagement with the cylindrical perimeter of the beam, said washers being adapted for abutment with the outboard brake head wall 12 to limit the before-mentioned outboard movement of the head relative to the trunnion 20. In the event that one or both of the springs 40, 40 breaks in service, excessive rotation of the head about the trunnion 20 is prevented in my novel arrangement by abutment of the fulcrumed ends 38, 38 of the levers with the adjacent washer 44, as will be clearly understood from a consideration of Figure 1, wherein it will be seen that each of the ends 38 is provided with a flat surface 46 for flat face engagement with the adjacent washer 44 to limit relative rotation between the head and the beam.

It will be noted that the friction means, in fact, comprises two independent or self-contained friction devices, each of which includes a lever 34 and an actuating spring 40 therefor. Each friction device, being self-contained, operates entirely independently of the other, so that failure of one of the devices will not incapacitate or affect the functioning of the other. The friction devices, as best seen in Figure 1, are arranged in counterbalancing relation and in working in opposition to each other cooperate to hold the head in a plane perpendicular to the trunnion 20 of the brake beam.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake head balancing device for an assembly comprising brake head and support members and a beam with a cylindrical trunnion extending through said members to afford a pivotal connection therebetween; the combination of spaced fulcrum means on said head member, spaced opposed levers in engagement at corresponding ends thereof with respective fulcrum means, resilient means compressed between the opposite corresponding ends of said levers and abutment means on said head member, arcuate surfaces on said levers frictionally engaging the cylindrical perimeter of said trunnion, and a bolt and nut assembly extending through an opening in said trunnion and secured thereto, said assembly comprising a washer having surfaces adapted for flat face engagement with the fulcrumed ends of said levers for limiting rotation of said head member on said trunnion, said washer being adapted for abutment with a portion of said head member to limit movement of the latter toward the end of the trunnion.

2. In a brake head balancing device, a break head with spaced walls, a support member therebetween, a cylindrical pivot member extending through complementary aligned openings in said walls and support member, a web connected by a trunnion to the adjacent wall, a lever with a hooklike arcuate portion at one end thereof engaging said trunnion, said lever having intermediate its ends a face formed as a segment of a cylinder, said face being in complementary engagement with the cylindrical perimeter of said pivot member, a spring seat lug connecting said web to said adjacent wall, a spring compressed between the other end of said lever and said lug, and means carried by said pivot member for limiting pivotal movement of said head.

3. In a brake head balancing device, a brake head with spaced walls, a support member therebetween, a cylindrical pivot member extending through complementary aligned openings in said walls and support member, a web connected by a trunnion to the adjacent wall, a lever with a hooklike arcuate portion at one end thereof engaging said trunnion, said lever having intermediate its ends a face formed as a segment of a cylinder, said face being in complementary engagement with the cylindrical perimeter of said pivot member, a spring seat lug connecting said web to said adjacent wall, a spring compressed between the other end of said lever and said lug, and means carried by said pivot member for cooperation with the fulcrumed end of said lever to limit pivotal movement of said head.

4. In a brake head balancing device for an assembly comprising brake head and support members and a beam with a cylindrical trunnion extending through said members to afford a pivotal connection therebetween; the combination of spaced fulcrum means on said head member, spaced opposed levers in engagement at corresponding ends thereof with respective fulcrum means, resilient means compressed between the opposite corresponding ends of said levers and abutment means on said head member, arcuate surfaces on said levers frictionally engaging the cylindrical perimeter of said trunnion, and means fixed to the beam for cooperation with the fulcrumed ends of said levers for limiting rotation of the head member relative to the trunnion.

5. In a brake head balancing device for an assembly comprising brake head and support elements and a pivot member with a cylindrical portion extending through aligned openings in said elements; the combination of a fulcrum on said head element, a lever engaged at one end thereof with said fulcrum, resilient means compressed between the opposite end of said lever and an integral wall on said head element, an arcuate surface on said lever intermediate its ends frictionally engaged with the cylindrical perimeter of said pivot member, and means carried by said beam for engagement with the fulcrumed end of said lever to limit rotation of the head element in one direction about said cylindrical portion.

6. In a brake head balancing device for an assembly comprising a brake head with spaced walls, a hanger extending therebetween, and a member with a trunnion portion extending through aligned openings in said walls and hanger to afford a pivotal connection therebetween; the combination of spaced levers each in frictional engagement intermediate its ends with the cylindrical perimeter of said portion, spaced fulcrums on said head for corresponding ends of said levers, coil springs compressed against the opposite corresponding ends of said levers, said springs being seated against integral lugs on said head, and means fixed to said trunnion for cooperation with portions of said levers to limit rotation of said head relative to said portion.

7. In a brake head device for an assembly comprising a brake head with spaced outboard and inboard walls, a hanger extending therebetween, and a member with a trunnion portion extending through aligned openings in said walls and hanger to afford a pivotal connection therebetween; the combination of spaced levers each frictionally engaging opposite sides of the cylindrical perimeter of said portion, spaced cylindrical fulcrum lugs on said head in complementary engagement with corresponding ends of said levers, housing means on the outboard wall of said head, and coil springs seated in said housing means and compressed against the opposite corresponding ends of said levers.

8. In a brake head balancing device, a brake head with spaced parallel walls, a support member therebetween, a cylindrical pivot member extending through complementary aligned openings in said walls and support member, a web substantially parallel with said walls and connected by a trunnion to the adjacent wall, a lever with a hooklike arcuate portion at one end thereof engaging said trunnion, said lever having intermediate its ends a face formed as a segment of a cylinder, said face being in complementary engagement with the cylindrical perimeter of said pivot member, a spring seat lug connecting said web to said adjacent wall, and a spring compressed between the other end of said lever and said lug.

9. In a brake head balancing device for an assembly comprising brake head and support members and a beam with a cylindrical trunnion extending through said members to afford a pivotal connection therebetween; the combination of spaced fulcrum means on said head member on the outboard side thereof, spaced opposed levers positioned outboard of said head member and in engagement at corresponding ends thereof with respective fulcrum means, spaced spring seat means on said head at the outboard side thereof, resilient means compressed between the opposite corresponding ends of said levers and respective spring seat means, said levers clasping said trunnion therebetween and having arcuate surfaces frictionally engaging the cylindrical perimeter of said trunnion.

10. In a brake head balancing device for an assembly comprising a brake head with spaced walls, a hanger extending therebetween, and a member with a trunnion portion extending through aligned openings in said walls and hanger to afford a pivotal connection therebetween; the combination of spaced levers each in frictional engagement intermediate its ends with the cylindrical perimeter of said portion, spaced fulcrums on said head remote from the shoe-engaging surface thereof for corresponding ends of said levers, and coil springs compressed against the opposite corresponding ends of said levers adjacent the shoe-engaging face of said head, said springs being seated against integral lugs on said head.

11. In a brake head balancing device, a brake head having spaced inboard and outboard walls, a hanger extending therebetween, a member pivotally interconnecting said walls and hanger, housing means on said outboard wall, and friction means housed within said housing means for cooperation with the cylindrical perimeter of said member, said friction means comprising a plurality of levers engaging said member and fulcrumed to said head at one side of said member, and resilient means disposed at the opposite side of said member adjacent the shoe-carrying face of said head and compressed between adjacent portions of respective levers and said head.

12. In a brake head balancing device, a brake head with spaced inboard and outboard walls, a hanger extending therebetween, a member pivotally interconnecting said walls and said hanger, housing means on said outboard wall, and friction means housed within said housing means for cooperation with the cylindrical perimeter of said member, said friction means comprising a plurality of levers, each fulcrumed at one end to a portion of said housing means, and resilient means within said housing means cooperating with the opposite end of each lever for urging the same into engagement with opposite faces of said perimeter.

13. In a brake head balancing device, a pivot member, a brake element mounted thereon, and a plurality of independent friction devices carried by the element at the outboard side thereof and embracing said pivot member therebetween, said devices being arranged in counterbalancing relation whereby said element is caused to be maintained substantially perpendicular to said pivot means, each friction device being self-contained and being operative entirely independently of the other of said devices.

14. In a brake head balancing device, brake head and support members, pivot means extending through openings therein, and friction means comprising a lever in frictional engagement with said pivot means, a fulcrum on said head member engaging one end of said lever, spring means carried by the head member and compressed against the opposite end of said lever, and rigid means carried by said pivot means for engagement with the fulcrumed end of said lever to limit rotation of said brake head member on said pivot means.

15. In a brake head balancing device, brake head and support members, pivot means extending through openings therethrough, housing means on said head member at the outboard side thereof, and friction means within said housing means comprising levers in frictional engagement with opposite faces of said pivot means, fulcrums on said head member for respective levers, and independent spring means within said housing means abutting respective levers and cooperating with said fulcrums for maintaining said levers against the respective faces.

16. In a brake head balancing device, an assembly comprising a brake head and a hanger, a pivot member extending therethrough and affording a pivotal connection therebetween, said head having a wall, housing means on said wall, friction means within said housing means including a plurality of lever means embracing said member, and retaining means on said member within said housing means between said lever means for maintaining said assembly on said member, said retaining means presenting stops engageable with certain portions of said lever means to limit rotation of said head on said member.

17. In a brake assembly, pivot means, a brake member pivoted thereon, friction means outside said member comprising lever means at opposite sides of said pivot means, fulcrum means on said member for each of said lever means and in abutment therewith, and spring means for each of said lever means compressed thereagainst and against said member, said friction means being arranged to work toward each other in counterbalancing relation whereby said member is caused to be maintained substantially perpendicular to said pivot means.

18. In a brake head balancing device for an assembly comprising brake head and support members and a beam with a cylindrical trunnion extending through said members to afford a pivotal connection therebetween, the combination of spaced fulcrum means on said head member at the outboard side thereof, spaced opposed levers positioned adjacent the outboard side of said head member and clasping said trunnion therebetween and in engagement at corresponding ends thereof with respective fulcrum means, spring abutment means on said head member at the outboard side thereof, resilient means compressed between the opposite corresponding ends of said levers and said abutment means, and arcuate surfaces on said levers frictionally engaging the cylindrical perimeter of said trunnion, said resilient means exerting substantially equal pressures against said levers and toward each other, whereby the pressure of said levers against the opposite sides of said trunnion is substantially in equilibrium and said head is maintained on said trunnion in a plane substantially at right angles to the axial line of said trunnion.

NORMAN FLESCH.

REFERENCES CITED

The following references are of record in the file of this patent:

UNITED STATES PATENTS

| Number | Name | Date |
|---|---|---|
| 1,022,440 | Perry et al. | Apr. 9, 1912 |
| 1,325,516 | Hedgcock | Dec. 23, 1919 |
| 1,604,351 | Hedgcock | Oct. 26, 1926 |